United States Patent Office 3,078,137
Patented Feb. 19, 1963

---

3,078,137
PROCESS OF DYEING STRUCTURES OF CELLULOSE ACETATES AND POLYESTERS
Hans Baumann, Ludwigshafen (Rhine), and Siegfried Huenig, Marburg (Lahn), Germany, assignors to Badische Anilin- & Soda-Fabrik Aktiengesellschaft, Ludwigshafen (Rhine), Germany
No Drawing. Filed Jan. 25, 1960, Ser. No. 4,173
Claims priority, application Germany June 14, 1955
1 Claim. (Cl. 8—57)

This invention relates to new colorings obtained on cellulose acetates and on linear polyesters with basic or cationic dyestuffs and to a process for the production of such colorings in a bath, by padding or printing.

We have found that powerful colorings having good fastness properties and above all good waste gas fastness are obtained on structures such as fibers, flocks, threads, foils, woven or knitted fabrics and other materials, such as felts and bonded fabrics of cellulose acetates or polyesters, e.g. on polyethylene terephthalate, by using dyestuff salts free from sulfonic acid groups the cation of which has the general formula (I)

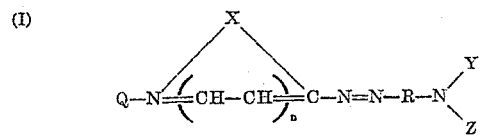

in which Q is an alkyl, aralkyl or cycloalkyl radical, $n$ is one of the integers zero and one, X represents a divalent atom or a divalent group which completes a five- or six-membered heterocyclic ring, R is an ortho- or para-phenylene or naphthalene group and Y and Z are hydrogen atoms or, possibly substituted, alkyl, aralkyl, cycloalkyl or aryl radicals or, jointly, are members of a, possibly substituted, heterocyclic ring.

For convenience, the two parts of the molecule which are attached to the —N=N— bridge of the above formula will hereinafter be referred to as "heterocyclic" (left-hand part of the above formula) and "aromatic" (right-hand part) components. The "heterocyclic" component may contain for example a thiazole, oxazole, imidazole, selenazole, thiadiazole, triazole, pyridine, pyrimidine or pyrrole ring, and their benzo and naphtho derivatives which may carry alkyl, alkoxy, aryl, halogen, acylamino and similar substituents, while the "aromatic" component may be the radical of an amine of the benzene or naphthalene series which may carry alkyl, alkoxy, acylamino, aryl or similar groups or halogen atoms. The radicals Y and Z in Formula I can be for example hydrogen atoms, methyl, ethyl, butyl and other alkyl, phenyl, tolyl and otherwise substituted phenyl, hydroxy and cyano alkyl, cycloalkyl or similar groups and, jointly, may form a morpholino, pyrrolidino or similar N-containing ring, the amino N-atom of Formula I being part of this ring.

The dyestuffs used for the process according to this invention may be prepared by various methods, for example by coupling a diazo compound of an amine of the formula (II)

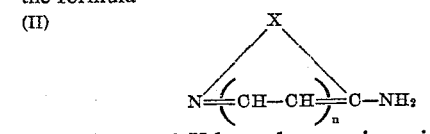

(wherein $n$ and X have the meanings given above) with an aromatic amine of the general formula (III)

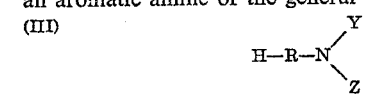

in which R, Y and Z have the above meanings, or by condensing a heterocyclic amine with a nitroso derivative of the "aromatic" components and treating the resultant dyestuff of the general formula (IV)

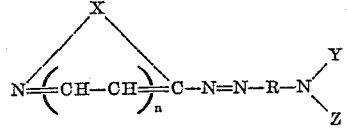

(in which X, $n$, R, Y and Z have the meanings given above) with alkylating agents, for example, alkyl, aralkyl or cycloalkyl halides, dialkyl sulfates or alkylsulfonic esters. The dyestuff salts obtained in this manner contain cations of the general Formula I in connection with any inorganic or organic anion as for example the chloride, bromide, iodide, perchlorate, the methyl or ethyl sulfate, the chloride+zinc (II) chloride or other double salt anions and are especially suitable for the dyeing of cellulose acetates. They produce pure red, violet, blue or blue-green dyeings which exhibit good fastness properties. A special feature of the dyeings on cellulose acetates thus obtained is their absolute fastness to waste gas. Even after they have been exposed to high-concentration nitrous gases for a long time, there is no perceptible change of shade.

The dyeing may be effected by any known method. It is carried out in an aqueous medium at elevated temperature, most successfully in a weakly acid, preferably acetic acid, bath. There may also be added to the dyebath anion-active auxiliaries (e.g. aryl alkyl sulfonates) and/or non-ionogenic auxiliaries (such as hydroxyethylated colophony) and/or other compounds, for example carrier substances. Furthermore, the dyestuffs may be applied to the material to be dyed by padding or printing according to conventional methods and may be fixed on the material by the thermic action of hot air or steam. Finally, the fastness to wet treatment may be further improved with the aid of known wet finishing agents, such as tannin and tartar emetic.

The following examples will further illustrate this invention but the invention is not restricted to these examples. The parts specified are parts by weight.

*Example 1*

100 parts of an acetyl cellulose fabric is dyed for one hour at 75° C. in a bath consisting of 5000 parts of water, 2 parts of the dyestuff the cation of which has the formula

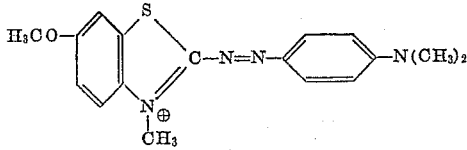

3 parts of acetic acid and 3 parts of the reaction product from 15 mols of ethylene oxide and colophony. The goods are placed in the bath at 25° C. The bath is then heated to 75° C. in the course of 20 minutes, and is kept at that temperature for 40 minutes. The fabric is dyed a pure blue and exhibits good fastness properties, especially very good waste gas fastness.

*Example 2*

100 parts of hank goods of acetyl cellulose is dyed for one hour at 80° C. in a bath consisting of 2000 parts of water, 1 part of the dyestuff the cation of which has the formula

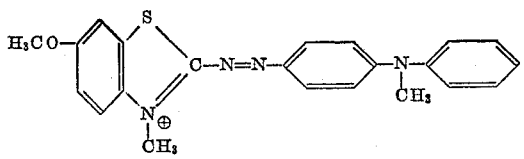

and 2 parts of acetic acid. There is obtained a clear, greenish blue dyeing having good fastness properties, in particular very good waste gas fastness.

*Example 3*

Acetyl cellulose piece goods are padded in a solution which contains in 1000 parts of water, 20 parts of the dye-stuff the cation of which has the formula

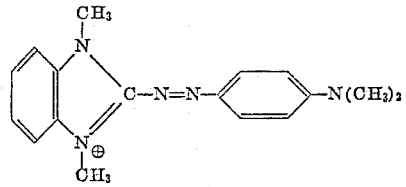

The fabric is then steamed for 5 minutes at 100° C. A clear red-violet dyeing having good waste gas fastness is obtained.

*Example 4*

100 parts of a fabric of triacetyl cellulose is dyed for 40 minutes at 95° to 100° C. in a bath which contains in 4000 parts of water, 1 part of the dyestuff used in Example 1 and 12 parts of finely divided phthalic acid dimethyl ester. There are obtained deep blue dyeings having good fastness properties, especially very good waste gas fastness.

*Example 5*

Acetate silk fabric is printed with a paste containing 25 parts of the dyestuff the cation of which has the formula

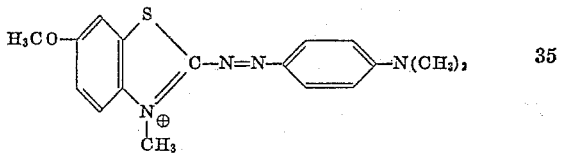

20 parts of thiodiethylene glycol, 30 parts of cyclohexanol, 50 parts of 30% acetic acid, 500 parts of crystal gum (1:2), 50 parts of resorcinol and 325 parts of water. The fabric is dried for 20 minutes in a star steamer at a pressure of 0.2 excess atmosphere and then rinsed. Powerful, clear blue dyeings of very good fastness properties are obtained.

*Example 6*

100 parts of a fabric of triacetyl cellulose is dyed for 90 minutes at 95° to 100° C. in a bath which contains 4000 parts of water, 1 part of the dyestuff the cation of which has the formula

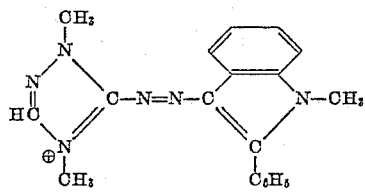

and 6 parts of Marseilles soap.

Reddish yellow dyeings having very good fastness properties are obtained.

By using the following dyestuff cations and working in the manner described in the foregoing examples there are obtained on cellulose acetates dyeings having equally good waste gas fastness:

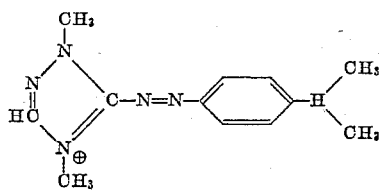

Red

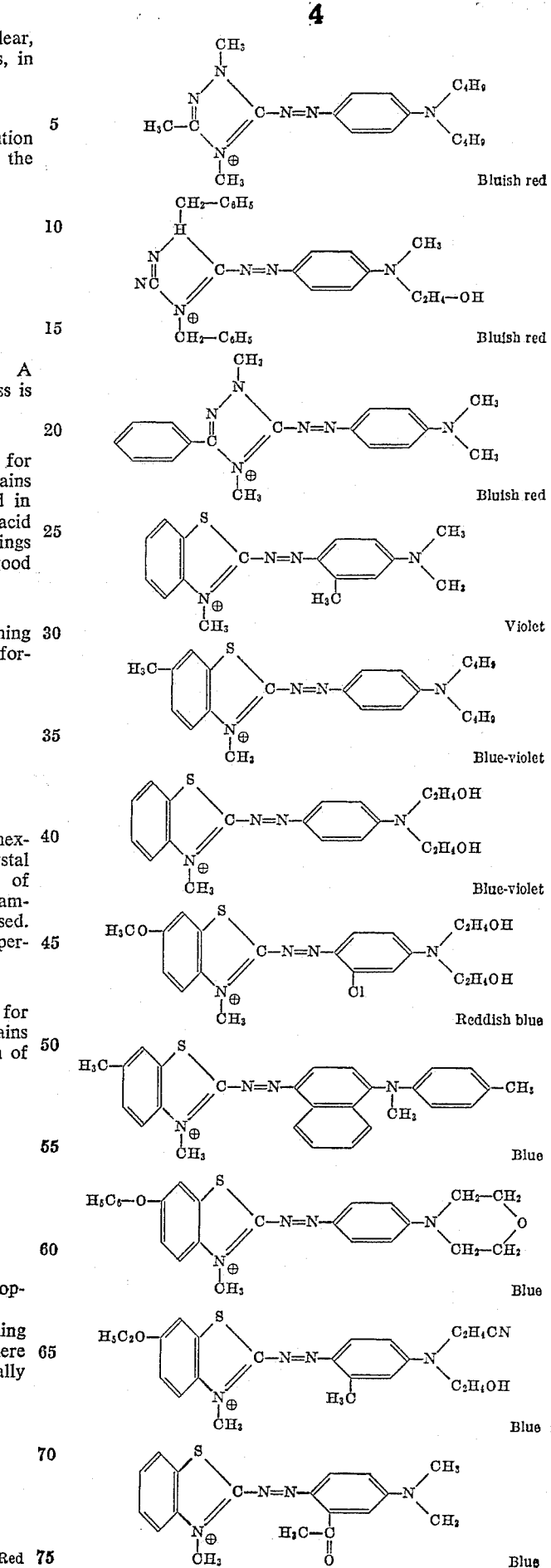

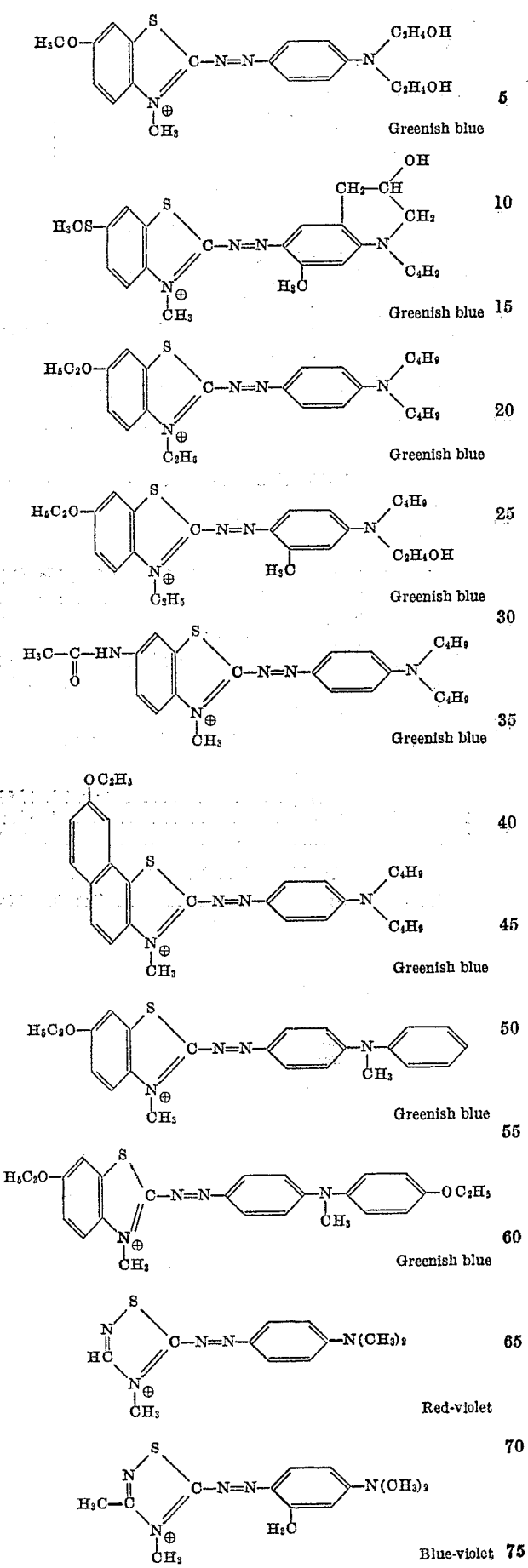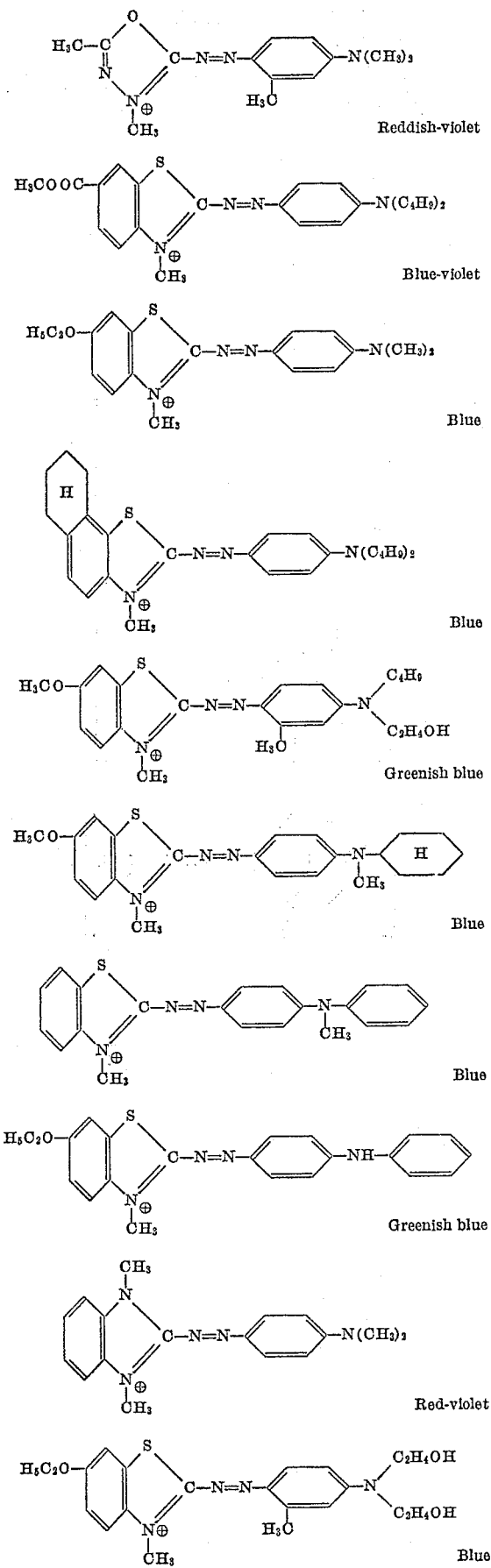
This application is a continuation-in-part of the copending application Serial No. 590,106, filed June 8, 1956, now abandoned.

We claim:

A cellulose acetate structure dyed with a dyestuff quaternary salt from the group consisting of

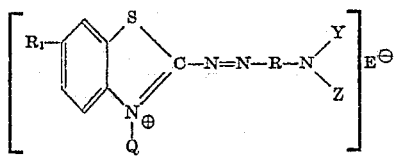

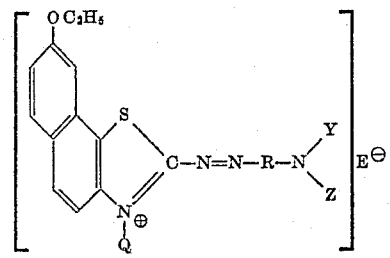

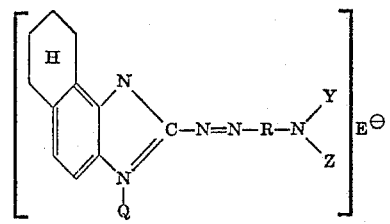

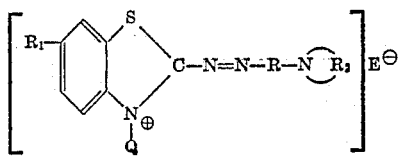

and

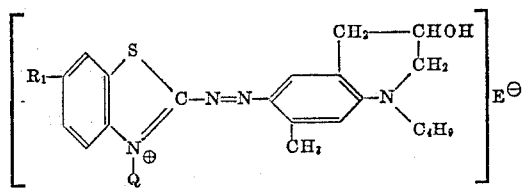

wherein

Q is a member selected from the group consisting of methyl and ethyl,

R is a member selected from the group consisting of phenylene, chlorophenylene, methyl phenylene and naphthalene groups, Y is a member from the group consisting of a hydrogen atom, alkyl, cycloalkyl, hydroxyalkyl, cyanoalkyl and aryl, Z is a member from the group consisting of a hydrogen atom, alkyl, and hydroxyalkyl, $R_1$ is selected from the group consisting of a hydrogen atom, a methoxy group, an ethoxy group, a methyl group, a phenoxy group, $CH_3S-$, an acetamido group, and

$R_2$ is a divalent group composed of atoms forming with the nitrogen to which $R_2$ is attached a member selected from the group consisting of a morpholino and a pyrrolidino group, and E is an anion selected from the gfroup consisting of chloride, bromide, iodide, perchlorate, methyl sulfate, ethyl sulfate and tetrachlorozincate.

References Cited in the file of this patent

UNITED STATES PATENTS

| | | |
|---|---|---|
| 2,832,764 | Huenig | Apr. 29, 1958 |
| 2,883,373 | Bossard | Apr. 21, 1959 |
| 2,951,847 | Baumann et al. | Sept. 6, 1960 |

FOREIGN PATENTS

| | | |
|---|---|---|
| 609,948 | Great Britain | Oct. 8, 1948 |

UNITED STATES PATENT OFFICE
CERTIFICATE OF CORRECTION

Patent No. 3,078,137                          February 19, 1963

Hans Baumann et al.

It is hereby certified that error appears in the above numbered patent requiring correction and that the said Letters Patent should read as corrected below.

Column 6, lines 1 to 7, for that portion of the formula reading $\diagup O \diagdown$      read      $\diagup S \diagdown$ Signed and sealed this 24th day of December 1963.

(SEAL)
Attest:
ERNEST W. SWIDER

Attesting Officer

EDWIN L. REYNOLDS

Acting Commissioner of Patents